June 27, 1950    E. O. ROGGENSTEIN    2,512,879
RECORD SENSING DEVICE OF THE CAPACITIVE
TYPE FOR USE WITH BUSINESS MACHINES
Filed Jan. 20, 1948                    7 Sheets-Sheet 1

FIG. 2

INVENTOR
E. O. ROGGENSTEIN
BY Anthony Mantione
AGENT

June 27, 1950 E. O. ROGGENSTEIN 2,512,879
RECORD SENSING DEVICE OF THE CAPACITIVE
TYPE FOR USE WITH BUSINESS MACHINES
Filed Jan. 20, 1948 7 Sheets-Sheet 2

INVENTOR
E. O. ROGGENSTEIN
BY Anthony Mantione
AGENT

June 27, 1950

E. O. ROGGENSTEIN 2,512,879

RECORD SENSING DEVICE OF THE CAPACITIVE
TYPE FOR USE WITH BUSINESS MACHINES

Filed Jan. 20, 1948

INVENTOR
E. O. ROGGENSTEIN
BY Anthony Montieone
AGENT

E. O. ROGGENSTEIN 2,512,879

RECORD SENSING DEVICE OF THE CAPACITIVE
TYPE FOR USE WITH BUSINESS MACHINES

Filed Jan. 20, 1948

INVENTOR
E. O. ROGGENSTEIN

BY Anthony Mantione

AGENT

Patented June 27, 1950

2,512,879

UNITED STATES PATENT OFFICE 2,512,879

RECORD SENSING DEVICE OF THE CAPACITIVE TYPE FOR USE WITH BUSINESS MACHINES

Edwin O. Roggenstein, Ilion, N. Y., assignor to Remington Rand Inc., New York, N. Y., a corporation of Delaware Application January 20, 1948, Serial No. 3,341

2 Claims. (Cl. 175—41.5)

*Compensating sensing condenser*

This invention relates to record sensing devices for use with business machines, and more particularly to adjustable capacitive apparatus suitable for operation by cards, tapes or the like formed with depressions or holes which vary in depth in accordance with numerical or other data recorded thereon.

Several methods have been tried for varying the capacity of a capacitor in accordance with the condition of a record carrying material. Broadly, one or more of the factors determining the capacity of a condenser have been varied in order to change the capacity and, by the use of associated circuits to produce a voltage dependent upon the capacity, that by additional equipment may be made to perform useful work. First, the difference in thickness of the dielectric or the presence or absence of holes in a dielectric material passing between fixed plates may be utilized. The differences in thickness of the dielectric or the presence or absence of a hole in the dielectric, cause a change in the capacity of the condenser formed by the plates and dielectric which in turn causes a change in the current flowing in an electrical circuit.

The distance separating the plates of a condenser may be made to vary with the varying depth of the holes. However, this is not a linear relationship where the plates have a fixed effective area.

The present invention contemplates a novel arrangement wherein, the area of the plates of the capacitor within the electrostatic field which is the effective area of the capacitor, may be varied. This type of capacitor is most easily calibrated and utilized as it is linear.

Even with variable area capacitive sensing of impressions on a record bearing material, variations in the thickness of material introduce an error. The present invention utilizes a pair of concentric variable condensers with a common outer hollow cylindrical plate and a pair of co-operating relatively movable coaxially disposed inner plates to avoid this difficulty. One of the movable plates is arranged to overlap the outer plate by an amount dependent upon the depth of a depression in the record material and the other movable plate by an amount dependent upon the thickness of the record material at the point being sensed. An increase in the thickness of the material will decrease the capacity of one condenser while increasing the capacity of the other condenser. By connecting the two condensers in parallel this fact is utilized to compensate for the possible errors that might be introduced by differences in the thickness of material between two successive holes of equal depth.

Signals so obtained may be caused to do useful work by means of an electrical circuit that may take several forms. In one form the signal is fed through the coils of a group of relays in series, each relay coil having a lower number of effective turns in its winding than the last. Thus a current sufficient to operate one relay will also operate all those having a higher resistance, assuming that the same kind of wire is used for the windings of all relays. The relay contacts are arranged so that while all the relays having at least a certain resistance operate, only the one of these with the least resistance is effective to operate its associated device.

Another method is to connect the coil of each relay as part of a series resonant circuit tuned to a particular frequency. The relays all have the same kind of windings. Each relay coil and associated tuned circuit is connected across the output of the oscillator, amplified if necessary. Maximum current will flow through that relay whose associated circuit is tuned to the frequency of the signal. This maximum will be sufficient to operate that relay. The other relays will receive a current insufficient to operate them.

Either of these methods may be used to sense more complicated information contained in two or more rows of depressions in the record material by using the signal derived from one hole to select a chain of relays and the signal from another of these rows of holes to select a relay from amongst the previously selected chain.

An object of this invention is to produce an electrical signal with an amplitude dependent upon the depth of successive depressions sensed in a record material.

Another object of this invention is to produce electrical signals of an amplitude independent of the thickness of the record material.

Another object of the invention is to make the signal amplitudes vary linearly with the depth of the successive depressions.

Another object of the invention is to translate variations sensed from depressions in a record bearing material into another representation of the same information, such as printed characters.

Still another object of the invention is to sense the information contained in two depressions spaced at right angles to the direction of the motion of the record bearing medium.

Other objects and structural details of the invention will be apparent from the following description when read in connection with the accompanying drawings, wherein.

Figure 1:
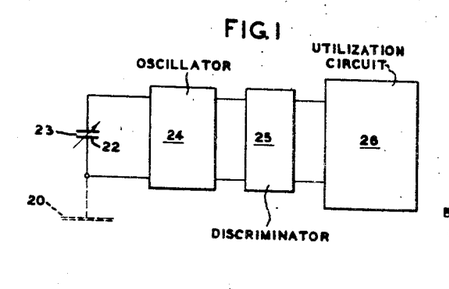
Fig. 1 is a block diagram of the sensing unit.
Figure 2:
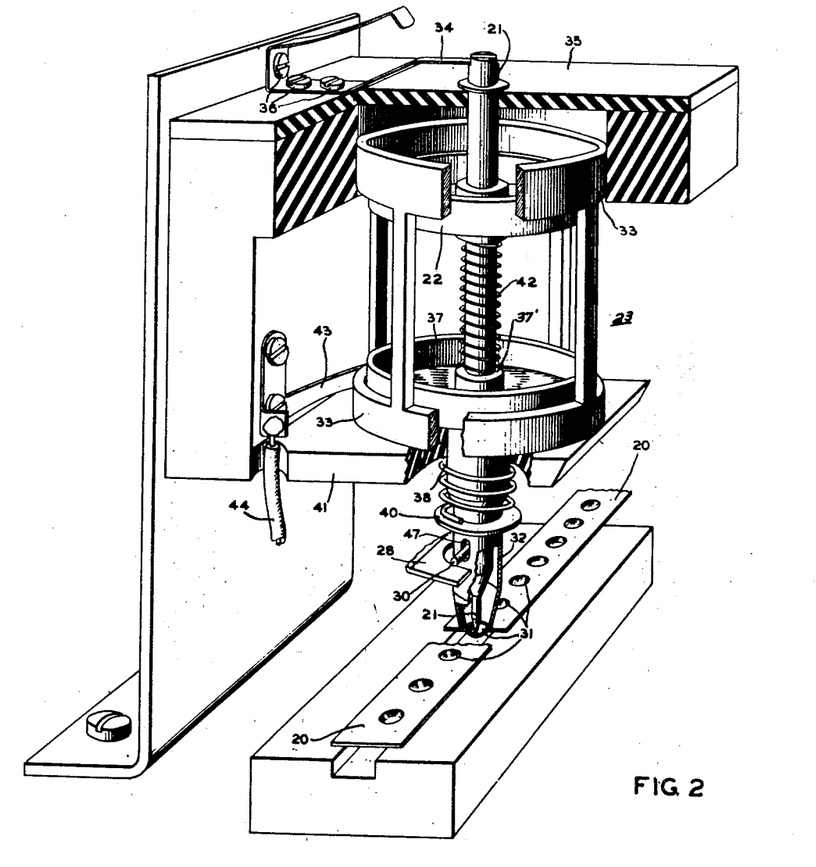
Fig. 2 is an isometric view of the capacitor.

Referring to Figs. 1 and 2, the numeral 20 refers to the record material that is sensed by a probe 21 which communicates mechanically with a variable cylindrical capacitor plate 22 of a capacitor 23. The capacitor 23 is connected across the tank circuit of an oscillator 24 coupled to a discriminator 25 whose output is used to actuate a utilization circuit 26.

Changes in thickness of the record material 20 are communicated by the probe 21 to change the area of the plates within the electrostatic field of the capacitor 23. This results in a change in capacity. This change in capacity in the tank circuit of the oscillator 24 results in a change in frequency that is in turn converted into a change in output current by the discriminator 25. This change may be utilized through relays and solenoids in circuit 26 to have any desired result.

Figure 3:
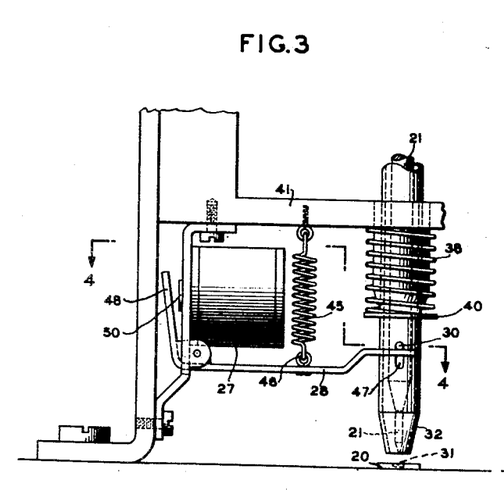
Fig. 3 is a side elevation of the probe, sleeve, tape and device for lifting the probe and sleeve free of the tape when not sensing.
Figure 4:
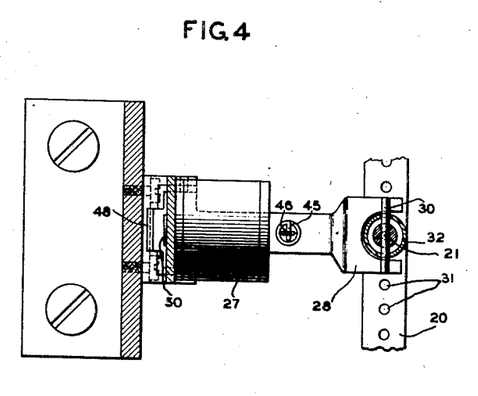
Fig. 4 is a section along 4—4 of Fig. 3.
Figure 5:
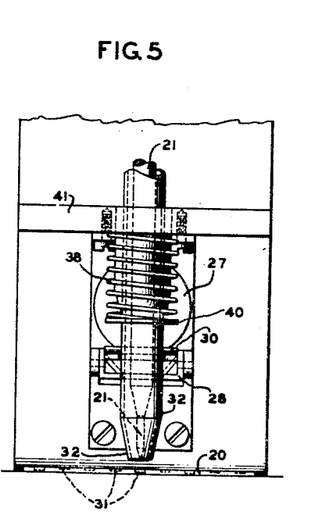
Fig. 5 is an end view of the same assembly shown in Fig. 3.

In the capacitor shown in Fig. 2 the probe 21 is free when released by the action of a solenoid 27 upon a forked lever 28 and pin 30 shown in greater detail in Figs. 3, 4 and 5 to drop into a hole or depression 31 while a sleeve 32 remains on the undisturbed surface of the record material 20. Probe 21 supports the variable cylindrical capacitor plate 22, mounted within an outer cylindrical plate 33, and is urged downward against the upper surface of the record material 20 by means of a spring 34 of conductive material. The spring 34 is attached to a stationary frame 35 of insulating material by the screws 36. This spring 34 also serves to ground the plate 22 through a shield (not shown). The sleeve 32 is mechanically attached to the hub 37' of a lower inner cylinder 37 that slides on probe 21 within the outer cylinder 33 and is urged downwardly by spring 38 pressing downward against a collar 40 fixed on the sleeve 32 and upwardly against a bracket 41. The lower inner cylinder 37 is attached mechanically by a light compression spring 42 to the variable plate 22. The outer cylinder 33 is connected to a source of positive potential, not shown, through a conductive spring 43 and a wire 44.

Figures 6, 7, 13, 14:
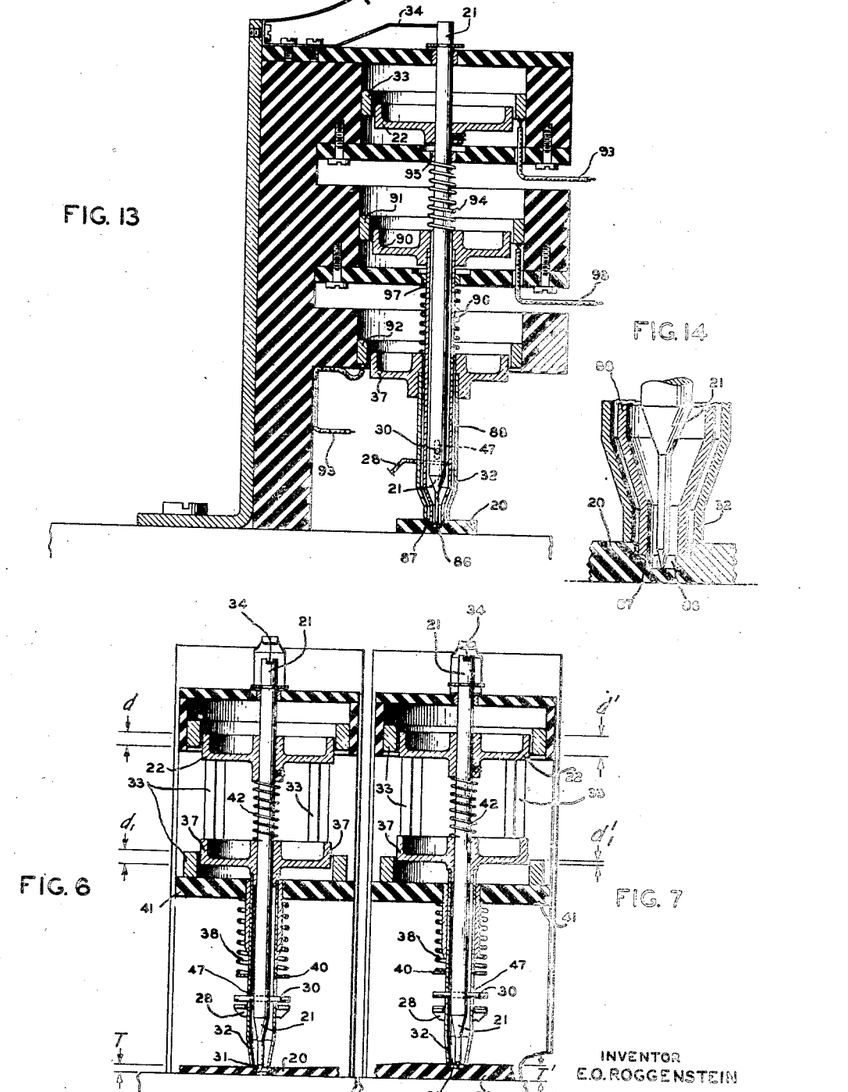
Fig. 6 is a section through the concentric capacitors and a strip of dielectric material at one sensing position.
Fig. 7 is a section through the concentric capacitors and a strip of dielectric material at another sensing position.
Fig. 13 is a side elevation partially in section of another device for sensing information of two classes contained in one hole.
Fig. 14 is a detail of the hole with shelves sensed by the device of Fig. 13.

The above described devices may be used to sense either depressions 31 as shown in Fig. 2 or cylindrical holes 31 as shown in Figs. 6 and 7. It will be noted that the compensating capacitor 33 shown in Figs. 6 and 7 is identical with that shown in Fig. 2 except that in Figs. 6 and 7 the probe 21 is adapted to sense holes of varying depth rather than depressions as in Fig. 2. The sleeve 32 thereof operates to sense the thickness of material as before.

Referring to Fig. 2, it will be seen that the depressions 31 may be successively sensed by the probe 21 by simply sliding the record material from one sensing stage to another without having to withdraw the probe 21 during this movement. In sensing holes 31 as shown in Figs. 6 and 7, however, it is desirable that the probe be withdrawn from engagement with the record material between sensing stages so that jamming of the probe against the sides of the holes as the record material is advanced would not occur. To this end, provision is herein made whereby the probe 21 is withdrawn from the hole 31 and the sleeve 32 is moved free of the record when the sensing of one hole 31 is completed and the record material 20 is spaced to the next sensing position. When the record material is moved to the next sensing position the probe and sleeve are then freed to sense the hole in that stage.

The probe 21 and sleeve 32 are retracted to non-sensing positions with respect to the record material 20 by the forked lever 28 held by the action of a spring 45 (Fig. 3) attached at the point 46 against the pin 30 driven through the probe 21 and passing through the slot 47 in the sleeve 32. This slot 47 is of sufficient length to permit the probe 21 to drop the maximum depth of any hole 31 while the sleeve 32 remains on the surface. The probe 21 and sleeve 32 are permitted to drop to sensing position when the armature 48, attached to the rear end of the lever 28, is drawn to the pole piece 50 of the solenoid 27. The solenoid energizes when a circuit is closed by contacts (not shown) actuated by the record escapement mechanism (not shown) so that the probe 21 and sleeve 32 are dropped only when the record material 20 is in sensing position.

In connection with the use of capacitative pickups for the purpose of sensing information in the form of holes or embossments, the use of probe 21 alone may lead to false signals due to possible variations in the thickness of the record material 20. How this error may arise is shown in Figs. 6 and 7 which show the same capacitors shown in Fig. 2 with different portions of the record in sensing position. The variation in thickness of the record material is exaggerated in these figures to better illustrate the operation of the invention. It is assumed that the outer cylindrical plate 33 remains in a fixed position at all times. When the probe 21 is in a hole 31 at a point where the thickness of the material 20 is T' the inner variable cylindrical plate 22 is driven by a probe 21 to a position with respect to the outer cylindrical plate 33 such that there will be an overlap of $d$. When the probe 21 is moved to another hole 31 shown in Fig. 7, of the same depth at a point in the material 20 where the thickness is T', the probe 21 will drive the inner cylindrical variable plate 22 further up to a position where the overlap of the two cylindrical plates will be a greater amount $d'$. This overlap determines the capacity of the condenser and so the electrical signal. As a result a false indication of decreased depth of hole will be given. This effect may be avoided in one of two ways. One method is shown in Figs. 6 and 7 and another in Figs. 8 and 9.

In Figs. 6 and 7 the effect of using a second inner cylinder 37 and sleeve 32 to compensate for any variations in the thickness of the material is shown. The first hole 31, Fig. 6, occurs at a point where the thickness of the record material may be taken as T. The second hole 31, Fig. 7, occurs at a point where the thickness may be taken as T'. Assume, then, that the depth of the hole 31 of Fig. 6 is the same as the hole 31 of Fig. 7. At hole 31 (Fig. 6) the probe 21 causes the cylindrical plate 22 to overlap the cylinder 33 by the amount $d$ while the sleeve 32 causes the cylinders 33 and 37 to overlap by the amount $d_1$ to give a total capacity modified according to the thickness of the record material. The hole 31 of Fig. 7 due to the greater thickness of the record material causes the probe 21 to move upward pushing the plate 22 further into the cylinder 33 increasing the overlap to $d'$ and so increasing the capacity of the capacitor. The surface of the record material causes sleeve 32 to move upward an equal amount reducing the overlap of the cylinders 33 and 37 by the same amount to $d'_1$ to compensate for the increased thickness of the record material.

Figure 8:
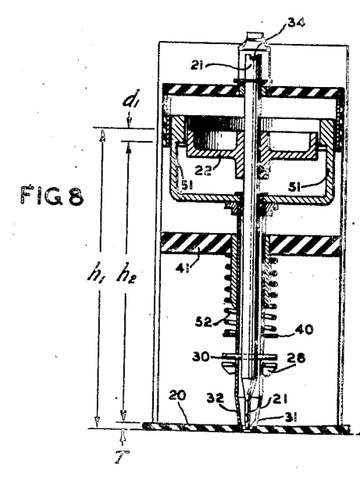
Fig. 8 is a vertical section through a modification of the condenser disclosing a single set of condenser plates and a strip of dielectric material at one sensing position.
Figure 9:
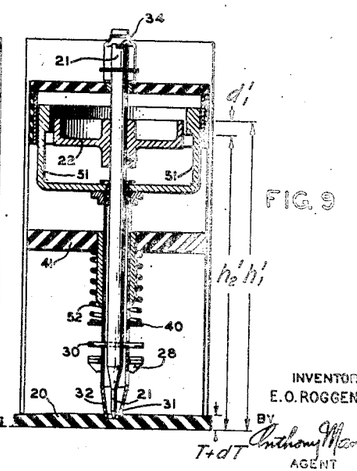
Fig. 9 is a vertical section through the modification of Fig. 8 and a strip of dielectric material at another sensing position.

Figs. 8 and 9 show how this may be accomplished with a more simple structure. In this case both the inner and outer cylinder are movable. The outer cylinder 51 is mounted so as to move with the sleeve 32. This may be done by arranging a spring 52 to urge it downward against the record material 20 from the bracket 41. In this case an increase in the thickness of the record material 20 by an amount $dT$ raises both cylinders by an equal amount and there is no change in the overlapping area.

In some applications difficulty may be experienced in retaining the alignment of the parts during their movement. Also it may be desirable to have small vertical movements of the sensing pin 21 and sleeve 32 cause relatively great movements of the inner cylindrical plates 22 and 37 of the condensers. This may be accomplished by the arrangement shown in Fig. 10.

Figure 10:
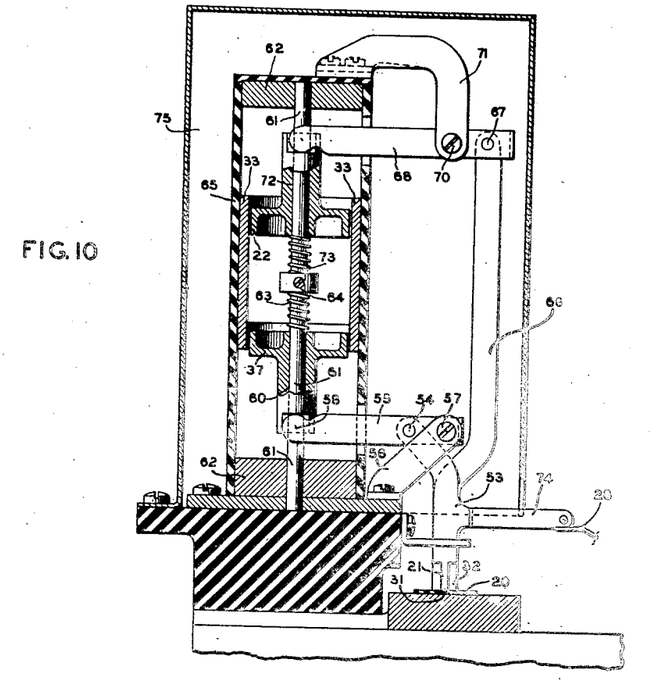
Fig. 10 is a vertical section through another modification of the condenser disclosing lever operated condenser plates.

The holes or depressions in the record material 20 are sensed by the probe 21. This probe 21 communicates its movement mechanically to the lower variable cylindrical plate 37 through the lever system comprising the arm 53 pivotally connected at pivot 54 to the short arm 55 that is supported on the bracket 56 by the pin 57 and communicates its vertical motion to the inner cylindrical plate 37 through the ball and socket joint 58. The inner plate 37 is formed with a hole 60 along its vertical axis through which is passed a rod 61 supported in the frame 62. The plate 37 is urged downward by a spring 63 thrusting against a stop 64 about the rod 61. The outer cylindrical plate 33 is mounted on a support 65 of dielectric material.

The surface of the record material is sensed by the lower end 32 of an upwardly extending arm 66 whereby movement thereof is communicated mechanically to the upper inner cylinder 22 of the compensating condenser. The upper end of the arm 66 is loosely pivoted at 67 to an arm 68 pivoted at 70 to a bracket 71. Vertical movement of arm 66 is thereby communicated to the inner cylindrical plate 22 of the compensating condenser. As with the other inner cylindrical plate 37 cylindrical plate 22 is formed with an axial hole 72 so that it may slide on the rod 61 within the outer cylindrical plate 33. The cylindrical plate 22 is urged upward by a spring 73 thrusting against the stop 64 and mounted on the rod 61. The probe 21 and "sleeve" 32 may be lifted manually if desired, by a lever 74. This lever may also be used to apply the spring 45 of Fig. 3 and solenoid operated lever 28 to lift the probe 21 and arm 66. The entire structure may be mounted in an outer shield or dust cover 75.

The outer cylindrical plates 33 may be formed of one piece as shown in Fig. 10 or may be connected together and to the high side of the oscillator 24 by a suitable conductor. The inner cylindrical plates 22 and 37 are conductively connected together and to ground through the spring 63, the stop 64, the spring 73 and the rod 61 that are made of conductive material for this purpose. Otherwise the operation is the same as that of the embodiment shown in Fig. 2. The advantage of this structure is its lateral stability due to the central rod 61.

Figure 11:
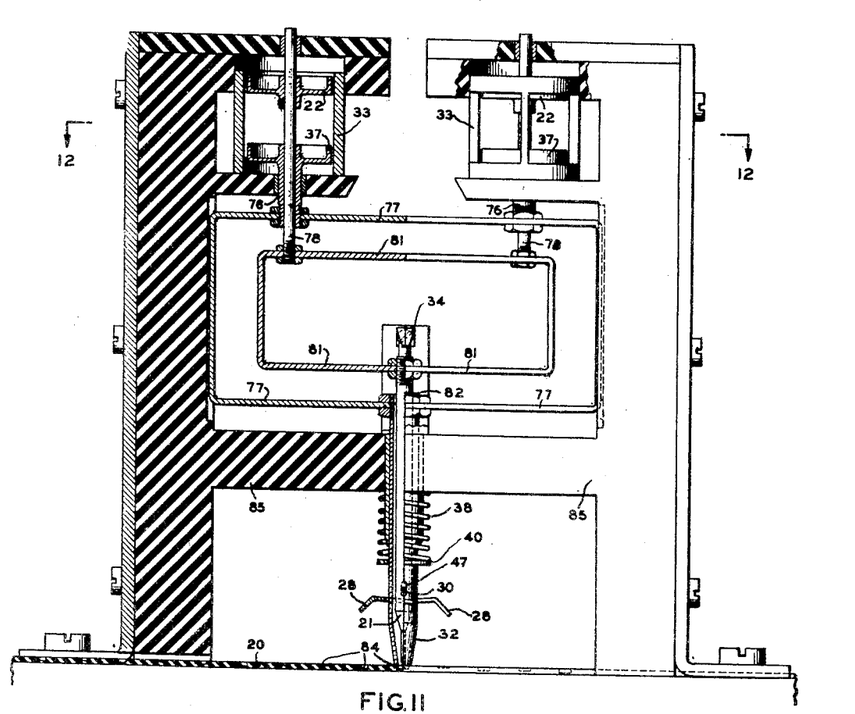
Fig. 11 is a side view partly in section disclosing the arrangement of compensating condensers for sensing two closely spaced holes.
Figure 12:
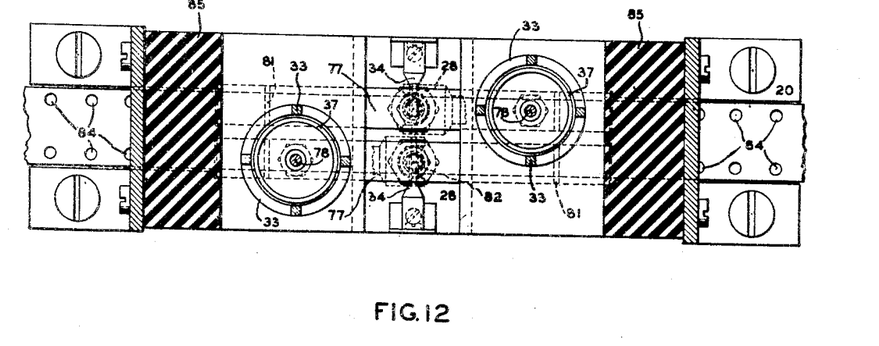
Fig. 12 is a top plan view partly in section taken on lines 12—12 of Fig. 11.

In certain applications it may be necessary to sense the information contained in two holes spaced across the direction of motion of the record medium. For this purpose two pairs of capacitors of the type shown in Fig. 2 are so mounted that while they are widely separated their probes 21 and sleeves 32 may sense two closely spaced holes 31 and communicate their movement to their inner cylinders 22 and 37 through two parallel sets of bails. Such an arrangement is shown in Figs. 11 and 12. For clarity one pair of condensers and its associated bail, sleeve and probe will be described. A sleeve 76 forming part of the lower inner cylinder 37 of one of the two compensating sensing condensers is attached to its associated bail 77. The lower portion of the bail 77 is attached to a sleeve 32 the lower portion of which is adapted to bear on the surface of the record material 20. The cylinder 37 is guided for vertical movement by means of a rod 78 to the upper end of which is secured the upper inner cylinder 22. The lower portion of the rod 78 passes through sleeve 76 and is secured at the lower end thereof to a bail 81 mounted within bail 77 and coplanar therewith. The lower portion of bail 81 has secured thereto the upper end of a rod 82 which is guided for vertical movement within the sleeve 32. The lower end of the rod 82 forms a probe which is adapted to sense the holes 84 in the record medium 20. Both sensing condensers are mounted upon the upper portion of a frame 85.

Another means of accomplishing the above result is shown in Figs. 13 and 14. By this means additional information may be impressed in a hole 86 in the record bearing material 20 by adding a shelf 87 or a plurality of them to the walls of the hole 86. This shelf is sensed by a second sleeve 88. The bottom of the hole is sensed by a probe 21 and the surface of the material by a sleeve 32. The probe 21 is mechanically connected to the inner cylinder 22, arranged to be concentric with the outer cylinder 33. The sleeve 88 is mechanically connected to an inner cylinder 90 concentric with an outer cylinder 91. The outer sleeve 32 is secured to the inner cylinder 37 concentric with the outer cylinder 92.

The two upper outer cylinders 33 and 91 are connected electrically, each in turn to the high side of the oscillator 24 by wires 93 through relay contacts described in connection with Fig. 17. The lowest outer cylinder 92 is separately connected by wire 93 to the high side of the oscillator 24. The uppermost inner cylinder 22 is attached to the probe 21 that is urged downward by the spring 34 connected to ground.

The middle inner cylinder 90 is urged downward by a coil spring 94 attached to the bushing 95 and making electrical contact through it with the rod 21.

The lowest inner cylinder 37 is urged downward by a coil spring 96 attached to a bushing 97 and making electrical contact through it with the sleeve 88 that electrically connects with the middle inner cylinder 90.

Cylinders 37 and 92 together form the compensating condenser associated with the sleeve 32. Cylinders 90 and 91 together form one sensing condenser associated with the sleeve 88. Cylinders 22 and 33 comprise the third condenser associated with the probe 21. Condensers 90, 91 and 22, 23 may be successively switched into the circuit by means of relay 116 of Fig. 17 or any other suitable means. Additional cylinders and sleeves for sensing additional shelves in the hole may be added as desired.

As was previously mentioned in connection with Fig. 1, the variations in frequency produced by the varying depths of the depressions in the record material are to be converted into a usable form. One method is to convert these varying frequencies into varying direct current by the discriminator 25 and then to use them in the utilization circuit 26. For simplicity of explanation, it is assumed that the various depressions in the record material 20 represent digits 0-9 and that the number representing the digit is to be printed.

Figures 15, 16:
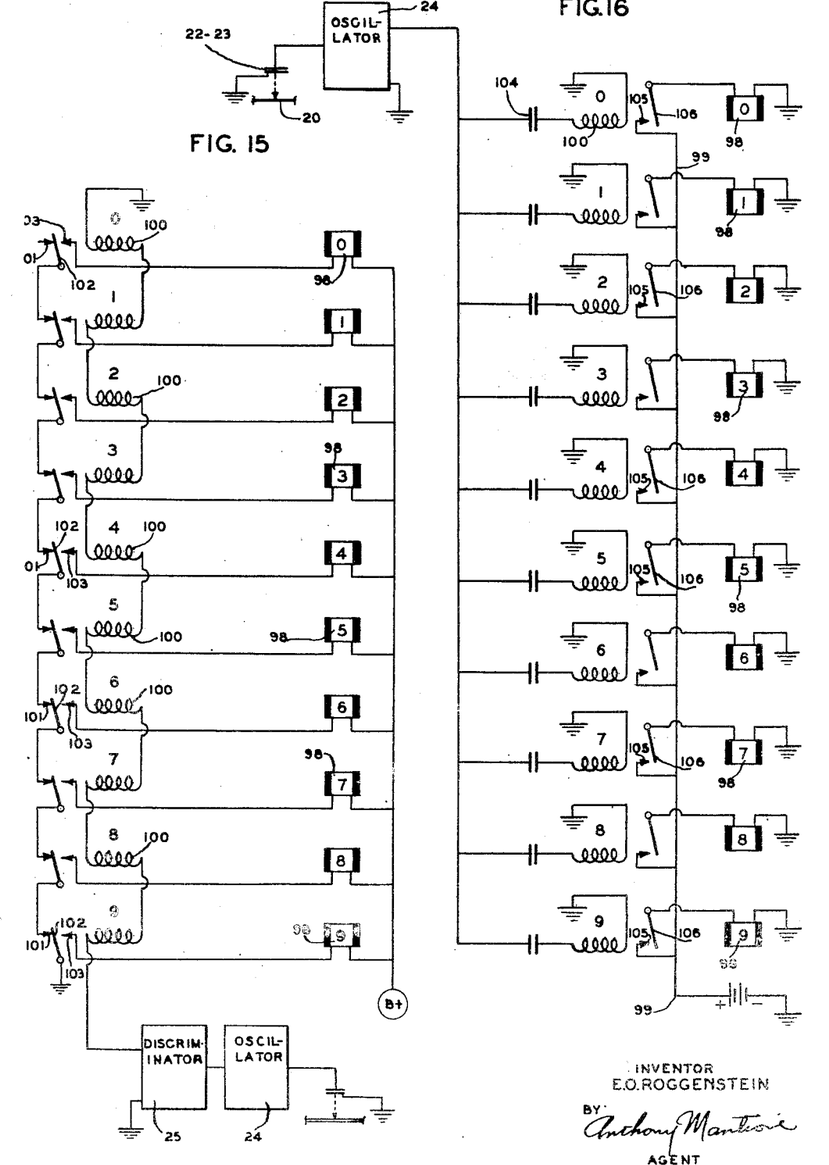
Fig. 15 is a schematic diagram of the sensing device including the utilization circuit of Fig. 1 in more detail.
Fig. 16 is a schematic diagram of the sensing device including another modification of the utilization circuit shown in Fig. 15.

As is particularly shown in Fig. 15, the direct current from the discriminator 25 passes through the coils 100 of a plurality of relays 0-9 and then back to ground. Each of the coils 100 when energized operates to open contacts 101, 102 and close contacts 102, 103. When the contacts 102, 103 are thus closed a circuit is established from ground through contacts 102, 103 through an associated printing solenoid 98 to the B+ terminal. The coils 100 of the relays 0-9 are connected in series and are each wound with a progressively lower number of effective turns whereby, assuming the coils are wound with the same kind of wire, the coil of the 0 relay has the highest resistance and the coil of the 9 relay has the lowest resistance. Normally, contacts 101, 102 of each 0-9 relay are in a closed position and contacts 102, 103 are in an open position as shown in Fig. 15. With the contacts 101, 102 in closed position and with no current flowing through any of the coils 100, it will be seen that the contacts 101, 102 will be connected in series with no return line from contact 101 of the 0 relay to contact 102 of the 9 relay.

As has been explained, each of the coils 100 are wound with a progressively lower number of effective ampere turns with the coil of the 0 relay having the highest number of turns. Accordingly, if the current is sufficient to energize the coil of the 6 relay so as to close its contacts 102, 103, the coils of the 0-5 relays will also have sufficient current to close their respective contacts. Associated with each of the 0-9 relays and under control thereof is the solenoid 98 operable to control the operation of the mechanism such as might be used in a business machine for printing characters 0 to 9. It is to be understood, however, that the printing of any type of characters may be under control of the solenoids 98 and the action of said solenoids may be transmitted for performing functions in punching, sorting or the like. One end of each of said solenoids is connected to its associated contact 103 and the other end connected to a common positive source of supply.

In operation, let us assume that sufficient current is supplied to energize the relay coils 100 of the 0-5 relays so as to close their respective contacts 102, 103, but not enough current is supplied to the coils of the 6-9 relays to close their respective contacts 102—103. It will be seen, therefore, that in this case contacts 102, 103 of relays 0-5 will be closed and contacts 102, 103 of the 6-9 relays will remain open. With the relays so conditioned, current will flow from the B+ line to the 5 solenoid 98 associated with the 5 relay through contacts 102, 103, thereof, and through contacts 101, 102 of the 6-9 relays back to ground. It will be seen that the circuits for the solenoids 98 associated with the 0-4 relays will be open due to the ground connection being open at contacts 101, 102 of the 5 relay. The circuit for the solenoids 98 associated with the 6-9 relays will be open because the contacts 102, 103 associated therewith are open. The result, therefore, is that only the solenoid 98 associated with the 5 relay is in a complete circuit and can operate to print the character representing the numeral 5. It will be seen that this selective condition can be effective to operate in a like manner for the remaining numerals and characters in accordance with the magnitude of the current flowing from the discriminator 25.

Another method of selecting the proper printing solenoid 98 is shown in Fig. 16. In this embodiment, the capacity of the pickup condenser 22—23 is varied by the depressions 31 in the record material 20 and this varies the output frequency of the oscillator 24. This output is fed in parallel to each of the series resonant circuits including the coil 100 of each of the relays numbered 0-9, and a capacitor 104 to tune each circuit to a selected frequency within the range of the oscillator 24.

Each coil 100 controls the closing and opening of an associated normally open pair of contacts 105, and 106 whereby a solenoid 98 may be energized and deenergized to control printing of numerals 0-9. Upon closing of contacts 105 and 106, by the passage of sufficient current through their associated coil 100, a circuit is completed from the positive terminal of a common source of potential, through line 99, through contacts 105 and 106 and through the associated solenoid 98 back to the negative terminal of the source of potential.

When a signal of a particular frequency, chosen to represent the numeral 5, for example, appears across the output of the oscillator 24, the maximum current will flow in the coil 100 of the relay and no other, because the capacity of the capacitor 104 has been so chosen as to give series resonance at this frequency.

As has been previously described in connection with Figures 11, 12, 13 and 14, means are herein provided whereby two holes may be simultaneously sensed, one hole representing a group classification of a character and the other hole representing the character itself. The holes sensed change the capacity of the condenser which in turn determines the frequency of the oscillator 24 and the magnitude of the output of the discriminator 25.

Figure 17:
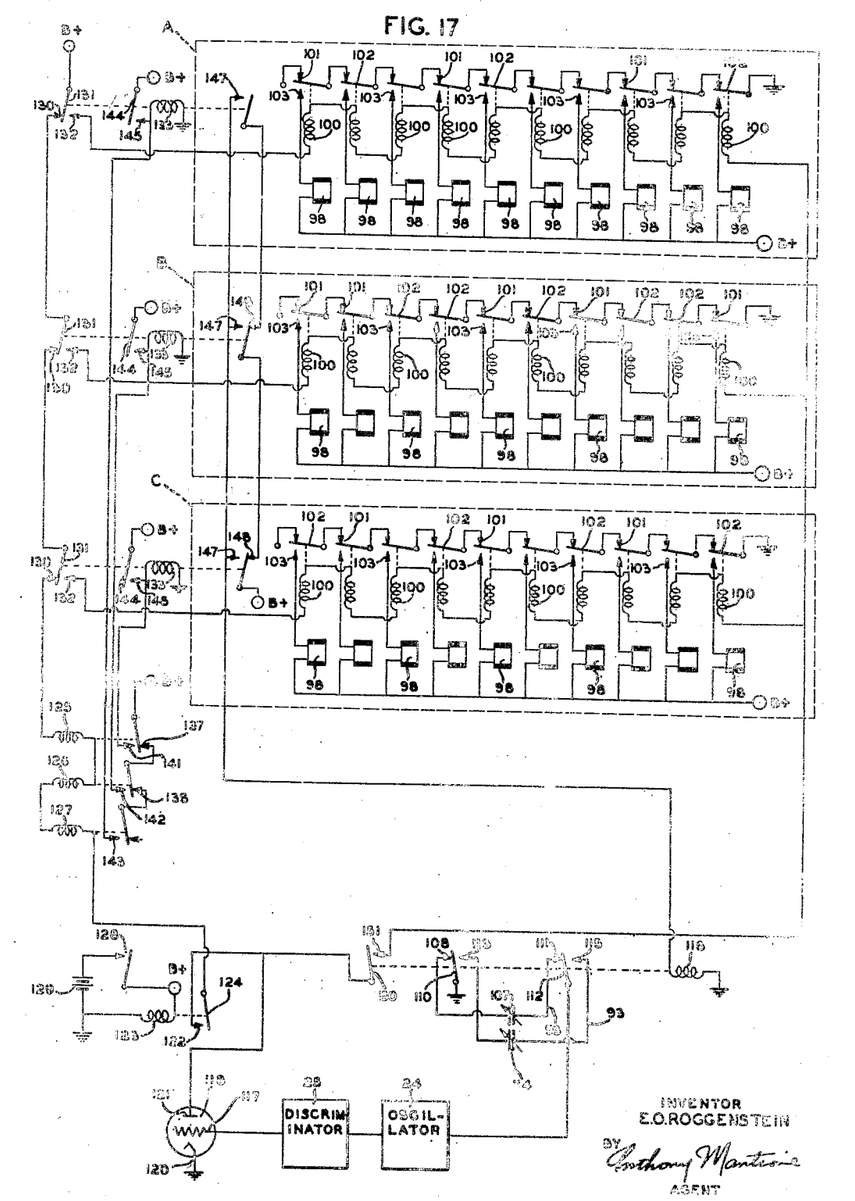
Fig. 17 is a schematic diagram of the sensing device including a utilization circuit for utilizing the signal from two rows of depressions.

Referring to Fig. 17, normally the high side of the tank circuit of the oscillator 24 is connected to a chain sensing condenser 107 through contacts 111, 112 and to the other side of the condenser through contacts 108, 110 and ground. The oscillator is connected to one side of a character sensing condenser 114 through normally open contacts 112, 115 and to the other side through normally open contacts 110, 113 and ground. The normally open contacts 110, 113 and 112, 115 may be closed to establish a circuit between the oscillator and the character sensing condenser 114 by means of a relay coil 116, later to be described. When the coil 116 is energized, it opens contacts 108, 110 and 111, 112 to open the circuit to the condenser 107 and closes contacts 110, 113 and 112, 115 to establish a circuit to the condenser 114. As before, the output of the oscillator 24 is converted into direct current by the discriminator 25, the output of which may be applied if necessary to the signal grid 117 of a power tube 118. The cathode 120 of this tube is connected to ground and the plate 121 is connected in a manner to be described, to a source of positive potential through normally open contacts 122, 124 of a relay coil 123. One end of the coil 123 is connected through a normally open pair of contacts 128 to the positive terminal of a source of potential 129 and the other end connected to the negative terminal of the source of potential. It will be noted that all B+ terminals refer back to the B+ terminal for the coil 123 whereby current may be supplied to said terminals from the same source of potential 129 provided that the contacts 128 are closed. The contacts 128 are under control of the record feeding mechanism (not shown) whereby the contacts are closed only during the time the record is in sensing position.

The following is the manner in which the plate 121 of the power tube 118 is connected to the positive source of potential:

From the plate 121, through contacts 122, 124 through relay coils 125, 126 and 127 and through three pairs of normally closed contacts 130, 131 to the B+ terminal. It will be seen that the magnitude of the current which flows through the coils 125, 126 and 127 is dependent upon the signal impressed upon the grid 117 which in turn is under control of the group classification hole sensed. The relay coils 125, 126 and 127 are similar in arrangement, construction and operation to those described in connection with Figure 15 and are wound in a manner to offer successively lower number of turns with the coil 127 offering the highest resistance to the passage of the plate current and the coil 125 the lowest resistance. Accordingly, these coils are utilized to select a particular relay chain A, B or C in accordance with the group classification of a character. The coils 125, 126 and 127 are each adapted to control the opening and closing of respective contacts 141, 137, 142, 138 and 143. Normally, the contacts 137 and 138 are closed whereby a circuit is not completed from the B+ connection to contacts 141, 142 and 143 which control the circuits for the chains A, B and C. The contact 143 is connected to one end of a relay coil 133 for controlling the relay chain A, the contact 142 is connected to one end of the relay coil 133 for controlling the relay chain B, and the contact 141 is connected to one end of the relay coil 133 for controlling the relay chain C. The other ends of each of the relay coils 133 are connected to ground. When, for example, current is supplied to the relay coils 125, 126 and 127, as above described, and the current is sufficient only to fully energize relay coils 126 and 127, it will be seen that their respective contacts 142 and 143 will be closed and contact 141 will remain open. Current will then flow from the B+ terminal through contacts 137, contacts 142, and thence through relay coil 133 associated with the relay chain B to ground. It will be noted that with contacts 142 and 143 in the closed position, current will not flow from the B+ terminal to contacts 143 due to the contact 138 being open. Similarly current will not flow through the relay 133 associated with the relay chain C because contacts 141 remain open.

When the relay coil 133 associated with chain B is energized as above described, it will close its associated contacts 144, 145 to establish a holding circuit for said coil from the B+ terminal through contacts 144, 145 and through the coil 133 to ground. It will be noted that each of the coils 133 are connected to a similar holding circuit. Energization of the relay coil 133 will effect closing of another pair of contacts 147 whereby a circuit is established to energize the previously mentioned relay coil 116 from the B+ terminal through a pair of normally closed contacts 148, through contacts 147 and through relay coil 116 to ground. Each of the relay coils 133 have associated therewith a pair of normally open contacts 147 and the coils 133 associated with the relay chains B and C control the opening and closing of another pair of contacts 148. With the relays arranged as above, it will be seen that, if the relay coil 133 associated with the relay chain A is energized to close its contact 147, circuit will be established from the B+ terminal through normally closed contacts 148 associated with the relay chain C, through contacts 148 associated with relay chain B, through contacts 147 (now closed) and through coil 116 to ground. If, now, relay coil 133 associated with relay chain C is energized, circuit will be established through B+ terminal, through contacts 147 (now closed) and through relay coil 116 to ground.

It will be recalled that normally a circuit is established through closed contacts 108, 110 and 111, 112 to connect the capacitor 107 across the tank circuit of the oscillator 24 to determine its frequency of oscillation and thus the output of the discriminator 25. Now, however, when the relay coil 116 is energized as above described, the contacts 108, 110 and contacts 111, 112 will be broken to disconnect the capacitor 107 from the oscillator 24. When this occurs the contacts 110, 113 and 112, 115 are closed to connect the capacitor 114 with the oscillator 24 to determine its frequency of oscillations as was similarly done in connection with capacitor 107. It will be recalled that the connection to the positive source of potential of the plate 121 included the normally closed contacts 130, there being one for each relay chain A, B and C. Each of the contacts 130 are opened upon energization of its associated relay coil 133 whereby the current to the relay coils 125, 126 and 127 is cut off. Upon the opening of the contacts 130 through the energization of its associated relay coil 133, contacts 132 are closed whereby current is supplied to the coils of its associated relay chain A, B or C.

It will be understood at this point that the structure, arrangement and operation of each relay is similar to that described in connection with Figure 15 and similar reference characters are applied to denote similar elements. For a matter of simplicity, let it be assumed that the sensed group classification character was such as to energize the relay coil 133 associated with the relay chain A. Accordingly, a holding circuit is established for the coil 133, and contacts 132 and 147 are closed. At this time the relay coil 116 has closed contacts 110, 113, and 112, 115 whereby the character sensing capacitor 114 is now connected to the oscillator and the normally open contacts 150, 151 are closed. With the circuits so conditioned, it will be seen that the signal output from the tube 118 which was derived from the capacitor 114 will pass through closed contacts 150, 151 (now closed), through relay coils 100 associated with the relay chain A and through contacts 131, 132 to B+.

As in connection with Figure 15, the relay coils 100 are each wound with a decreasing number of ampere turns in a manner to offer successively lower resistance to the passage of current with the leftmost coil 100 (Fig. 17) offering the highest resistance and the rightmost coil offering the lowest resistance. Each of the coils 100 may be energized to close contacts 102, 103 and open contacts 101, 102. The contacts 101, 102 are normally closed and serially connected to ground. The contacts 103 are each connected to one end of a solenoid 98, the other end of which is connected to B+.

The operation of the above circuit is similar to that previously described in connection with Figure 15. Therefore current will fully energize all those coils offering a resistance in excess of the next succeeding coils to thereby close the associated contacts 102, 103. This will cause current to flow from the B+ terminal through the solenoid 98, associated with the relay coil 100 having the least resistance of those fully energized relays, through contacts 102, 103 of its associated relay and through contacts 101, 102, of the next succeeding relays that are not fully energized, to ground. It will be seen that current will not flow through the solenoids 98, to the left of the effective solenoid because their respective contacts 101, 102 are open.

In operation, when the holes 31 in the tape 20 are stepped into position under the sensing capacitors 107 and 114, contacts 128 are closed by the feeding mechanism to cause current to flow through the relay coil 123 thereby closing contacts 122, 124. This completes the current path from B+ through contacts 130, 131, through relay coils 125, 126 and 127, and through the power tube 118 to ground. The capacitor selecting relay 116 not having been operated, the capacitor 107 is connected across the oscillator 24 through contacts 108, 110, and contacts 111, 112. This causes the oscillator to produce a predetermined signal in the output of the discriminator 25 that appears upon the grid 117 of the tube 118. As a result a signal of a predetermined magnitude flows through the tube 118 from the source of positive potential through contacts 130, 131, through coils 125, 126 and 127, through contacts 122, 124, through plate 121, and through cathode 120 of tube 118 to ground. As explained in connection with Fig. 15, all of the relay coils 125, 126 and 127, having higher than a minimum value of resistance, operate so that only one of the normally open contacts 141, 142 or 143 is effective to close a circuit from the B+ terminal to ground through one of the chain operating relay coils 133. The holding contacts 144, 145 of the relay coil 133 also close to hold the coil energized as long as the record medium is in sensing position. Its normally open contacts 147 close to connect the B+ terminal to ground through the coil of the relay 116. This relay opens the contacts 110, 108 and 112, 111 and closes contacts 110, 113 and 112, 115 to bring the sensing capacitor 114 across the oscillator 24 and sense the second hole. The signal derived from this second hole causes a current of a particular magnitude to flow from B+, through a pair of normally open contacts 131, 132 (now closed), through coils 100, of the previously selected chain, to thereby establish a circuit for the solenoid representing the particular character sensed in the manner described in connection with Fig. 15.

While I have described what I consider to be highly desirable embodiments of my invention, it is obvious that many changes in form could be made without departing from the spirit of my invention, and I therefore do not limit myself to the exact form herein shown and described, nor to anything less than the whole of my invention as hereinbefore set forth, and as hereinafter claimed.

What I claim is:

1. In a device of the character described, a record carrying medium with depressions of varying depth, a pair of capacitors comprising a movable cylinder and means to change the capacity of each of the capacitors by changing the effective area of its plates in relation to predetermined changes in the condition of each of two closely laterally spaced portions of a record carrying medium.

2. The device of claim 1 in which the means to cause the movable cylinder to move in response to changes in the depth of depressions in a record carrying medium includes a rod in contact with the record carrying medium, a bail attached to the rod, and another rod connecting the bail to the movable cylinder.

EDWIN O. ROGGENSTEIN.

REFERENCES CITED

The following references are of record in the file of this patent:

UNITED STATES PATENTS

| Number | Name | Date |
|---|---|---|
| 1,872,372 | Wensley | Aug. 16, 1932 |
| 2,231,174 | Trogner | Feb. 11, 1941 |
| 2,238,555 | Dudley | Apr. 15, 1941 |
| 2,322,563 | Bruno | June 22, 1943 |
| 2,368,052 | Unger | Jan. 23, 1945 |
| 2,368,953 | Walsh | Feb. 6, 1945 |
| 2,417,427 | Massonneau | Mar. 18, 1947 |
| 2,423,617 | Rath | July 8, 1947 |
| 2,443,125 | Weathers | June 8, 1948 |